US010204317B2

(12) United States Patent
Cunningham et al.

(10) Patent No.: US 10,204,317 B2
(45) Date of Patent: Feb. 12, 2019

(54) POST-BOOKING TRAVEL ASSISTANCE AND ORGANIZATION

(75) Inventors: Thomas B. Cunningham, Dallas, TX (US); John Samuel, Southlake, TX (US); Robyn Grassanovits, Southlake, TX (US)

(73) Assignee: Sabre GLBL Inc., Southlake, TX (US)

( * ) Notice: Subject to any disclaimer, the term of this patent is extended or adjusted under 35 U.S.C. 154(b) by 458 days.

(21) Appl. No.: 12/720,454

(22) Filed: Mar. 9, 2010

(65) Prior Publication Data

US 2010/0228577 A1   Sep. 9, 2010

Related U.S. Application Data

(60) Provisional application No. 61/158,548, filed on Mar. 9, 2009.

(51) Int. Cl.
*G06Q 10/10* (2012.01)
*G06Q 10/02* (2012.01)

(52) U.S. Cl.
CPC .............. *G06Q 10/10* (2013.01); *G06Q 10/02* (2013.01)

(58) Field of Classification Search
CPC ...................................................... G06Q 10/10
USPC .......................................................... 705/5–6
See application file for complete search history.

(56) References Cited

U.S. PATENT DOCUMENTS

| | | | | |
|---|---|---|---|---|
| 6,263,209 B1* | 7/2001 | Reed et al. | ................ | 455/456.3 |
| 6,587,780 B2* | 7/2003 | Trovato | ............... | G08G 1/0104 |
| | | | | 342/357.31 |
| 7,174,301 B2* | 2/2007 | Florance et al. | .............. | 705/313 |
| 7,312,712 B1* | 12/2007 | Worrall | .................. | G06Q 10/06 |
| | | | | 340/309.16 |
| 7,487,112 B2* | 2/2009 | Barnes, Jr. | .................... | 705/26.8 |
| 2002/0002548 A1* | 1/2002 | Roundtree | ....................... | 707/1 |
| 2003/0034958 A1* | 2/2003 | Waesterlid et al. | ........... | 345/158 |
| 2003/0055689 A1* | 3/2003 | Block et al. | ...................... | 705/5 |
| 2003/0140088 A1* | 7/2003 | Robinson et al. | ............ | 709/202 |
| 2003/0225600 A1* | 12/2003 | Slivka et al. | ..................... | 705/5 |
| 2004/0039613 A1* | 2/2004 | Maycotte et al. | ................ | 705/5 |
| 2004/0260598 A1* | 12/2004 | Kumhyr et al. | ................ | 705/10 |
| 2006/0081704 A1* | 4/2006 | Boyd | ............................ | 235/382 |

(Continued)

FOREIGN PATENT DOCUMENTS

WO   WO 2009/065638 A1 *   5/2009   .......... G08G 1/0968

OTHER PUBLICATIONS

Papinski, Dominik, Detecting Travel Mode Associated With Human Activity Patterns Utilizing Person-Based Global Positioning System Data, Wilfrid Laurier University, 2005.*

*Primary Examiner* — Nathan Erb
(74) *Attorney, Agent, or Firm* — Baker Botts L.L.P.

(57) ABSTRACT

To address post-booking and other issues, an application may be run on a user device, such as a mobile device, to provide improved, real-time travel organization and messaging. Some embodiments may also be configured to create, maintain, update, and delete a trip container to which trip content can be automatically or manually associated. In some instances, a user may be required to pay a fee to download the application and/or be required to pay a periodic subscription fee to facilitate ongoing functionality of the application. In addition to or instead of downloading the application, hardware (e.g., circuitry), firmware and/or other particular machine components can be configured to implement some or all aspects of the application.

23 Claims, 10 Drawing Sheets

(56) References Cited

U.S. PATENT DOCUMENTS

| | | | |
|---|---|---|---|
| 2006/0241983 A1* | 10/2006 | Viale et al. | 705/5 |
| 2007/0073552 A1* | 3/2007 | Hileman | 705/1 |
| 2007/0222595 A1* | 9/2007 | Motteram | G06Q 10/06 340/572.1 |
| 2007/0276706 A1* | 11/2007 | Dunsky | 705/5 |
| 2008/0046326 A1* | 2/2008 | Horstemeyer | 705/14 |
| 2008/0177584 A1* | 7/2008 | Altaf et al. | 705/5 |
| 2008/0319803 A1* | 12/2008 | Heyraud et al. | 705/5 |
| 2009/0006143 A1* | 1/2009 | Orttung et al. | 705/5 |
| 2009/0216569 A1* | 8/2009 | Bonev et al. | 705/5 |
| 2009/0216633 A1* | 8/2009 | Whitsett et al. | 705/14 |
| 2009/0276250 A1* | 11/2009 | King et al. | 705/5 |
| 2010/0070376 A1* | 3/2010 | Proud et al. | 705/21 |
| 2010/0190510 A1 | 7/2010 | Maranhas et al. | |
| 2011/0072076 A1* | 3/2011 | Stefani et al. | 709/203 |

\* cited by examiner

POST-BOOKING TRAVEL ASSISTANCE AND ORGANIZATION

CROSS-REFERENCE TO RELATED APPLICATIONS

This patent application claims priority to U.S. Provisional Patent Application No. 61/158,548, filed Mar. 9, 2009, entitled "TripView Platform," which is also hereby incorporated by reference in its entirety.

FIELD OF THE INVENTION

Embodiments of the present invention relate generally to post-booking travel services and, more particularly, to dynamic monitoring for alert generation as well as experience and information sharing.

BACKGROUND

The Internet has made booking travel accommodations and travel planning significantly easier. Travel planning websites, such as Travelocity.com, have enabled travelers to research, plan, and complete the booking of travel arrangements without the assistance of a travel agent. Among other things, such websites are used to book travel accommodations, such as airline tickets, hotel rooms, rental cars, and other activities, which are sometimes referred to herein as "travel components." Booking individual travel components enable a traveler to secure exactly the accommodations that fit the traveler's needs.

Recently, handheld internet-capable devices have become more prevalent. While travelers have been able to access online travel agencies with their laptop computers, people can now access their travel itineraries and receive e-mails with travel information using their handheld devices. Some travel agencies also provide information to customers in a format that is viewable on a mobile device that may lack a full web browser application. For example, a trip itinerary can be e-mailed to a customer in a format viewable by most scaled-down mobile browsers.

However, due to the vast amount of innovation that has gone into improving mobile devices, specially formatted e-mails are becoming less necessary. Many mobile devices now include web browsers that can display most, if not all, information provided in common website formats. Travelers can now use their mobile devices to sign into their online travel agency accounts and view information about their trip, including travel itineraries, confirmation numbers, and departure times.

In addition to accessing online content using a web browser, various types of mobile devices, including laptop computers, handheld devices and tablets, can run pieces of code, sometimes referred to as applications. Applications can be downloaded from an online store or other remote location and/or come pre-loaded on the mobile device. While some concepts related to applications, their various formats, means for installing, and means for running may be well known, each application has the potential to provide configuration data that cause the mobile device to provide novel functionality and features as well as solve problems faced by millions of people everyday.

BRIEF SUMMARY

To address post-booking and other issues, an application may be run on a user device, such as a mobile device, to provide improved, real-time travel organization and messaging. Some embodiments may also be configured to create, maintain, update, and delete a trip container to which trip content can be automatically or manually associated. In some instances, a user may be required to pay a fee to download the application and/or be required to pay a periodic subscription fee to facilitate ongoing functionality of the application. In addition to or instead of downloading the application, hardware (e.g., circuitry), firmware and/or other particular machine components can be configured to implement some or all aspects of the application.

The application may be used to provide an apparatus, system, method, or other means for accessing, downloading and displaying information. The information can be travel information associated with a previously planned travel itinerary (which may or may not be currently in progress), and be accessed or downloaded from a remotely located network device and/or a local storage component.

The application can be configured to determine a physical location (e.g., geospatial location) of a user device associated with the travel information. Circuitry can then use the location information and the travel information to generate event information. In some embodiments, the apparatus can be configured to determine a current time (e.g., time of day, time of month, time of year, etc.) and generate the event information based on the current time.

A display screen can be used to display the event information. Displaying the event information comprises displaying an alert, which may be included in the event information. One or more user-selectable options can also be displayed. The options may allow the user to, for example, view information associated with a different travel itinerary.

A determination can also be made as to whether a service and/or goods are available that may help reduce a negative consequence associated with the event information. A user-selectable option can then be generated offering to provide the service or to facilitate obtaining the good. For example, if a user has a meeting that runs late and causes the user to miss a flight, an event message can notify the user that a flight has been missed and offer to book new travel arrangements (such as, e.g., a new airline ticket, hotel reservations, car rental, etc.), modify existing travel arrangements (e.g., reschedule a subsequent meeting, calculate a new time of arrival based on a later train or bus and update the travel itinerary, etc.), cancel existing travel arrangements, facilitate the purchase of goods (offer dinner options), provide a coupon (for, e.g., goods, services or both, which may include a scannable barcode presented by the user device's display screen), among other things. The service or good can also be associated with the travel information.

In some embodiments, the service or good can be associated with the user's current or planned physical location. The physical location can be determined by a user device, a remotely located network device, or combination thereof. The event information can be generated by the user device, remotely located network device, or combination thereof.

The event information and/or other information can also be integrated into a message that is sent to another user device and/or network device. The message and/or its contents can be generated in response to receiving one or more user inputs. Sending the message can comprise utilizing a cellular telephone network and/or any other type of network. The information can then be posted to a website, which certain or all people can be allowed to access, interact and view the information.

Some embodiments also involve an apparatus, computer readable product, method and other means for storing information in a trip container. Trip content can be received by components of the user device (e.g., the camera, keyboard, other input component) and/or remote device (e.g., travel agency's server, corporate networked device, etc.) and a determination can be made with circuitry as to whether the trip content should be associated with a trip container. In response to determining the trip content should be associated with a trip container, the trip container can be identified. Identifying a trip container may involve generating a new trip container or locating an existing trip container. The trip content can then be associated with the trip container.

For example, the trip content can include travel itinerary information. If a new trip container is to be generated, the generation can be done automatically in response to determining that the trip content is unrelated to one or more existing containers. Generating the new trip container can also occur automatically in response to receiving an indication of a user's desire to create the new trip container.

A trip container can be configured to include at least three different types of data, such as metadata, booking data and/or notes. An action, service or both can be associated with one or more trip containers. The trip container can be stored in local storage of a user device and/or a network storage device located remotely from the user device.

In response to receiving additional trip content, a determination can be made by circuitry as to whether the additional trip content was received during a time, at a location or in association with another variable associated with one or more existing trip containers. If so, the additional trip content can be associated with the existing trip container(s). If not, the additional trip content can be associated with a new trip container. In some embodiments, the user can choose to associate trip content with a new trip container, even if it is or could be (e.g., meets the temporal, geospatial, or other rules to be automatically) associated with an existing trip container. Trip content can be associated with a trip container by adding a pointer or associating trip container-specific metadata with the trip content. The trip content can include pictures, video, text messages, tweets, e-mails, and/or anything else.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

To date, many post-booking consumer needs have not been adequately met. For example, following the booking of travel arrangements, there may be a desire for assistance in organization of a trip, sharing of information regarding a trip, the provision or receipt of alerts and updates, the provision or receipt of advice, as well as the providing and receiving of booking support. These features have not been sufficiently supported prior to the present invention.

To address these and other post-booking issues, an application, termed a TripCase application, may be downloaded from a network server or other network device to a user device, such as a mobile device (e.g., mobile telephone, personal digital assistant, laptop computer, digital camera, etc.), to provide improved mobile travel organization and alerting. In some instances, a user may be required to pay a fee to download the application and/or be required to pay a periodic subscription fee to facilitate ongoing functionality of the application. In addition to or instead of downloading the TripCase application, hardware (e.g., circuitry), firmware and/or other particular machine components can be configured to implement some or all aspects of the TripCase application.

Figure 1:
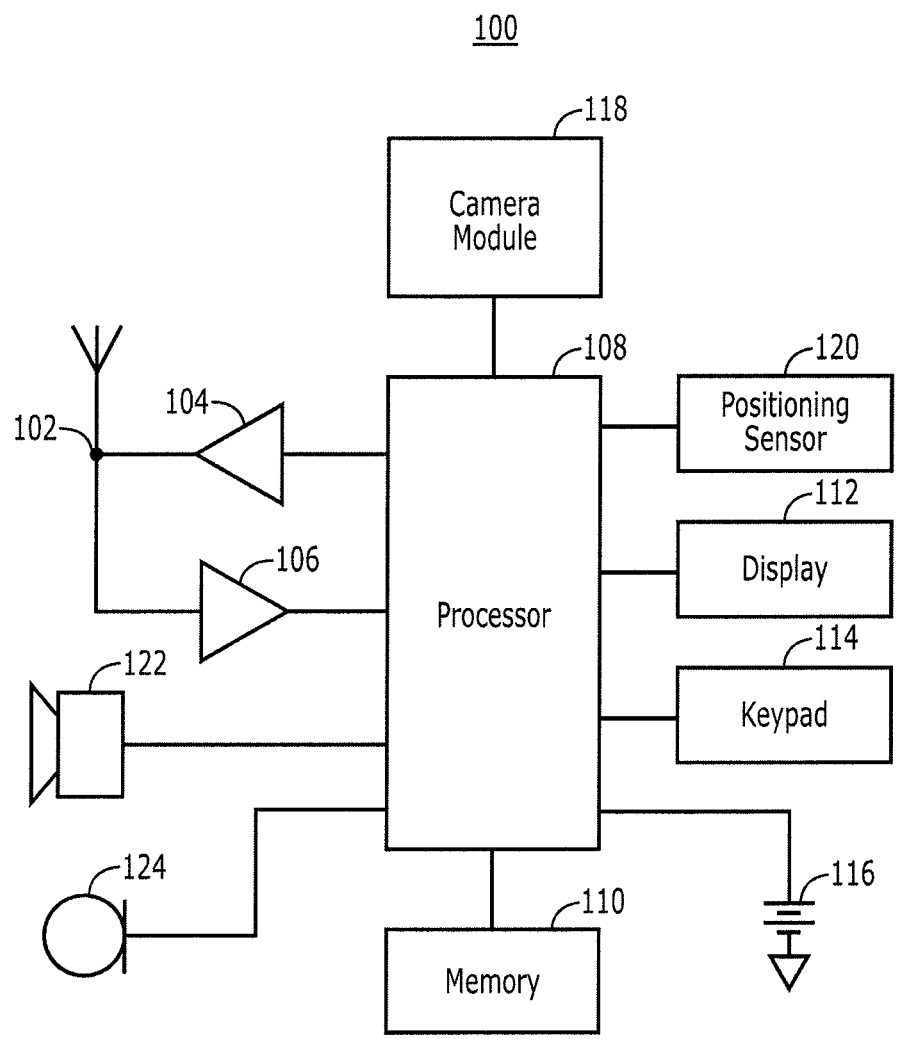
FIG. 1 shows a user device in accordance with some embodiments discussed herein.

Although the user device may be configured in various manners, FIG. 1 depicts user device 100 in accordance with some embodiments. While it should be understood that a mobile telephone is exemplary of one type of user device that would benefit from some embodiments of the present invention, other types of user devices, such as portable digital assistants (PDAs), laptop computers, tablets, digital cameras, and others can employ embodiments of the present invention.

As shown in FIG. 1 and discussed elsewhere herein (see, e.g., FIG. 6), user device 100 may be configured to communicate via a wireless communication network (such as a cellular network and/or a satellite network, a wireless local area network or the like) and, as such, may include one or more antennas 102 in operable communication with transmitter 104 and receiver 106. The user device 100 may further include a processor 108 that provides signals to and receives signals from transmitter 104 and receiver 106, respectively.

Processor 108 may include circuitry for implementing the functions of user device 100. For example, processor 108, such as its circuitry, may be comprised of a digital signal processor device, a microprocessor device, and various analog to digital converters, digital to analog converters, and other support circuits. Processor 108, such as its circuitry, may be configured to operate one or more software programs, such as the TripCase application, which may be stored in memory 110, memory internal to the processor (not shown), external memory (such as, e.g., a removable storage device or network database), or anywhere else. For example, processor 108 may be capable of operating a connectivity program, such as a conventional Web browser. The connectivity program may allow user device 100 to transmit and receive content via a wide area network, such as the Internet, either in addition to or instead of communicating via a wireless communication network.

According to some exemplary aspects of embodiments of the present invention, processor 108 may operate under control of a computer program product. For example, the memory 110 can store one or more application programs or other software executed by the processor to control the operation of the user device, such as the TripCase application. The computer program product for directing the performance of one or more functions of exemplary embodiments of the processor includes a computer-readable storage medium, such as the non-volatile storage medium (e.g., memory 110), and software including computer-readable program code portions, such as a series of computer instructions forming the TripCase application, embodied in the computer-readable storage medium.

As will be appreciated, any such computer program instructions may be loaded onto a computer or other programmable apparatus, e.g., processor 108, to produce a machine, such that the instructions which execute on the computer or other programmable apparatus (e.g., hardware) create means for implementing the above-described functions. These computer program instructions may also be stored in a computer-readable memory (e.g., memory 110) that may direct a computer or other programmable apparatus (e.g., processor 108) to function in a particular manner, such that the instructions stored in the computer-readable memory produce an article of manufacture including instruction means which implement the functions described herein (see, e.g., FIGS. 7 and 8). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the TripCase functions described herein.

User device 100 may comprise one or more user interfaces including output components, such as display 112 and speaker 122. User device 100 can also include one or more input components, such as keypad 114, camera module 118, positioning sensor 120, microphone 124 and/or any other input component(s). The input and output components can be electrically coupled to processor 108 as shown in FIG. 1. In some embodiments, display 112 can have touch capabilities and act as both an input and output component. FIGS. 2-5, discussed further below, show some examples of displays that can be presented by user device 100 having a touch or other type(s) of input/output components.

User device 100 further includes a battery, solar cell(s), mains power connection and/or any other power source, represented herein as power source 116, for powering the various elements that are required to operate user terminal 100.

In exemplary embodiments, user device 100 includes various types of specialized circuitry and other hardware that the TripCase application can leverage and coordinate to solve technical problems and enhance the functionality of common devices. For example, user device 100 can include input components, such as an image capturing element, which may be a camera, in communication with the processor 108. The image capturing element may be any means for capturing an image, video or the like for storage, display or transmission. For example, in exemplary embodiments including camera module 118, camera module 118 may include a digital camera capable of forming a digital image file from a captured image. As such, camera module 118 can include all hardware, such as a lens or other optical component(s), and software necessary for creating a digital image file from a captured image. Alternatively, camera module 118 may include only the hardware needed to capture an image, while memory device 110 of user device 100 stores instructions for execution by processor 108 in the form of software necessary to create a digital image file from a captured image. In an exemplary embodiment, camera module 118 (like any other component discussed herein) may further include a dedicated processing element such as a co-processor which assists processor 108 in processing image data and an encoder and/or decoder for compressing and/or decompressing image data.

User device 100, including processor 108, may be configured to determine the context of user device 100 and, as such, may include one or more additional input components. For example, user device 100 may further include positioning sensor 120, which may be, for example, a global positioning system (GPS) module in communication with processor 108. Positioning sensor 120 may be any means, device or circuitry for locating the position of user device 100, such as by means of GPS, an assisted global positioning system (Assisted-GPS) sensor, cellular triangulation, or the like.

Microphone 124 is another example of a type of input component that may be included in user device 100. Microphone 124 can be used to receive sound and generate corresponding electrical signals.

In addition to display 112, user device 100 can include one or more other output components such as speaker 122. Speaker 122 can be used to emit audible sound.

The TripCase application may be stored in memory 110 and may be accessed or executed by processor 108 to provide, among other things, the functionality described herein. The TripCase application may be provided for free, for a subscription fee, for an upfront fee, or a combination thereof (e.g., some features free, some for an upfront fee and/or some for a subscription fee). When implemented on a touch screen device, some embodiments of the TripCase application can enable user device 110 to provide one-touch access to all the critical details about the user's trip. The user can configure what details are critical, the application can be configured to determine what details are critical, and/or a backend system can determine what details are critical. Some examples of details that may be critical are discussed elsewhere herein and include, for example, time sensitive information (flight delay or current traffic information), information relative to the current phase of the trip (e.g., travel times of the next leg of the trip, maps or other directions applicable for the next leg of the trip, e.g., map from airport to hotel after landing), among other things.

Figure 2:
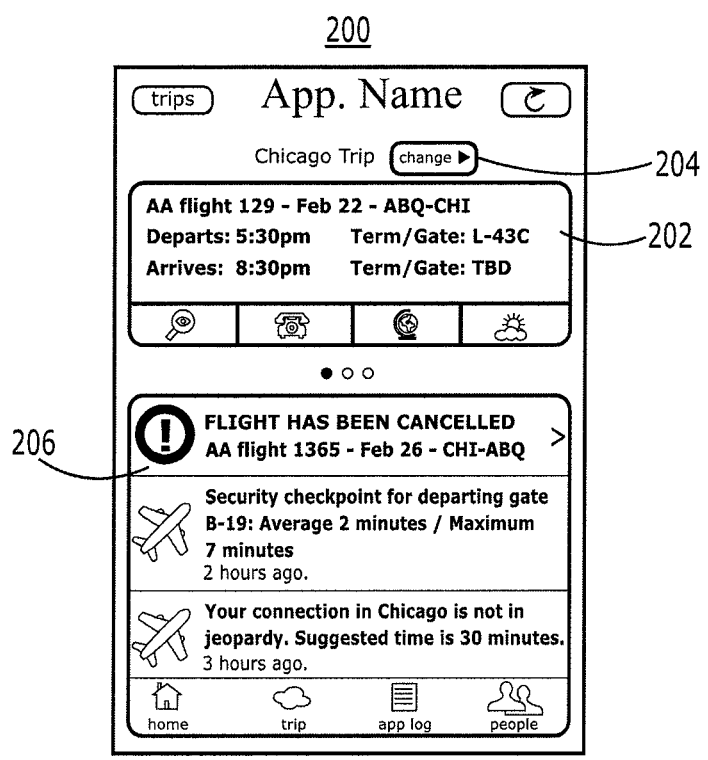
FIGS. 2-5 show some examples of screen shot displays can be presented by a user device in accordance with some embodiments discussed herein.

FIG. 2 shows an exemplary display, namely display 200, that presents various types of critical information user device 100 may have retrieved and/or received from remote and/or local components. Although display 200, like the other displays discussed herein, are shown as being optimized for the current iPhone™ platform, one skilled in the art would appreciate that the displays discussed herein (and other displays in accordance with the principles of embodiments discussed herein) can be implemented by any electrical device using any platform.

In user-selected section 202, the flight information for a user-selected flight is displayed. If the user has more than one set of travel arrangements scheduled, the user can select option 204 and cycle through and view each trip's information. In some embodiments, option 204 (or another user-selectable option that is not shown) can provide a pull down menu, pop-up screen or any other user interface that allows the user to select multiple trips' travel information for display in user-selected section 202 or elsewhere.

In system-selected section 206, information is displayed that the system may have determined to be critical. For example, the system may automatically be notified or pull information about a flight being canceled, which the user was scheduled to take within a first period of time (e.g., within a week, a month, or more). As another example, user device 100 can display the average wait time at, e.g., a corresponding security checkpoint for a flight the user is scheduled to take within a second period of time (e.g., hours, days, or more).

User device 100 can be configured to allow the user to scroll through information presented in one or more portions of display 200. For example, user device 100 can be configured to automatically determine the most critical information included in system-selected section 206 (and/or any other section) and present the most critical information in a manner that emphasizes its urgency (e.g., towards the top of the list). In other embodiments, one or more of the sections of display 200 can be organized in any other manner (e.g., alphabetically, chronologically, otherwise, or combination thereof).

In some embodiments, the system-selected section 206 can be generated from a discrete feature of the TripCase application. For example, system-selected section 206 is shown in FIG. 2 as implementing a "TripAlerts" feature, which may be bundled into the TripCase application, integrated independently, and/or implemented separately.

The TripAlerts feature can be used to combine time, location, and knowledge of future plans to give relevant information, alerts, and updates on the user device and to persons in transit. For example, subsequent to a TripContent container (discussed further below) being created, future travel plans can be "known" by the TripCase application. The TripCase application can then be configured to display TripAlerts in system selected section 206. TripAlerts can take the form of event messages (such as, e.g., e-mails, text messages, instant messages, etc.) that are based on one or more of current time, the current location of the traveler, and the known travel plans to create relevant travel messaging in transit.

For example, a user may be planning to return home later in the day, after traveling to a new city. The TripCase application knows and/or can be configured to determine "known information" that includes, for example, a) the user device's current location, b) the current time, and c) the scheduled flight time. As referred to herein, known information is any information that is known to the user device based on current configuration data and previously downloaded information, such as schedule information previously saved to local memory (including a travel itinerary), the current time, the current location, among others.

Because situations can change, the known information may be wrong or outdated. Processor 108, through execution of one or more applications (which may be running locally on user device 100 or at a remote location), can also be configured to retrieve additional information. As used herein, "retrieved information" refers to information retrieved from a remote location, such as remote server, database or other type of network device, in response to an automatically generated command and/or a command generated in response to receiving an indication of one or more user inputs. For example, user device 100 can retrieve traffic delay information and airport security wait times from remote databases in response to determining, based on algorithms incorporated in the TripCase application, that traffic and security wait times may be relevant to known information being displayed or being considered for display by the user device.

Algorithms running on user device 100 can require known information and/or retrieved information to determine, among other things, when to deliver a message to the user. For example, a "Leave for the Airport Now" message can prompt the user as to when it is the best time to begin traveling to the airport, such that the user arrives in time to make the scheduled flight. In generating the "Leave for the Airport Now" message, user device 100 may consider traffic delays, flight delays and other retrieved information as well as known information (e.g., scheduled departure time, current time, and current location). Other examples of messages user device 100 can deliver include, "Room is Ready" (if, e.g., a hotel room is not ready upon a user's arrival and becomes ready thereafter), a boarding gate change alert, a cruise ship departing warning, among other event messages. As such, in some embodiments, TripAlerts can provide intelligent messaging service based on actively monitoring relatively static known information and relatively dynamic retrieved information, which may effect a user's trip, to provide relevant alerts, notifications, and other types of event messages (e.g., when and/or where the user needs them most).

In some embodiments, known information and/or retrieved information can be used to implement a feature referred to herein as "Barrier Based" services. Barrier Based services are services (including messages, reminders, alerts, coupons, and other services) that are initiated in response to user device 100 determining a particular temporal, physical (based on, e.g., distance from a location), or other type of barrier has been broken or achieved. For example, user device 100 may automatically facilitate registering the user's arrival at a hotel upon determining that the user device is within a given amount of distance (e.g., 5 miles) or time (10 minutes) from the hotel. In this regard, the user would be checked into the hotel upon arriving.

Barrier Based services can compliment other features provided by TripCase. While some Trip Case features can be triggered in response to detecting or receiving one or more pieces of discrete data that are periodically surveyed, Barrier Based services can be triggered based on a more dynamic monitoring approach (being constant or near constant at times and nonexistent at other times). As such, one or more spatial-temporal and/or other types of events, which may be consistent with or inconsistent with known information can be monitored in a manner most suitable to the current situation.

The following is an example of a spatial-temporal event, which is inconstant with known information and causes the execution of a Barrier Based service. User device 100 may have known information that indicates the traveler is scheduled to depart Chicago at 6:00 pm (known information). As 6:00 pm approaches, user device 100 can be configured to more frequently determine its location. If the user device is still not at the airport by 5:45 pm, user device 100 can determine that a spatial-temporal barrier has been broken. In response to the dynamic monitoring and resulting detection of the occurrence of an event inconsistent with known information, user device 100 can implement a Barrier Based service, such as offering to book the traveler a later flight out of Chicago, another night at the hotel, a rental car, dinner reservations, or anything else. In some embodiments, the Barrier Based service can also include automatically posting a tweet or other message to a public or private message board, thereby informing others that the traveler is still in Chicago.

In embodiments where the traveler has multiple user devices each running a TripCase application, the devices can be configured to communicate with each other to determine if the traveler is in fact still in Chicago (e.g., if all the user devices are still in Chicago) or if the traveler simply lost user device 100 while in Chicago. If, for example, a central server or one of the user devices determines the traveler lost user device 100 in Chicago, other types of Barrier Based services can be implemented (e.g., remotely purge the hard drive of the lost device, etc.). Similar functionality can be implemented among multiple devices running the TripCase application, regardless of whether Barrier Based services are being implemented by one or more of the devices.

Some or all of the information included in display 200 can be available when user device 100 is offline and/or is unable to access one or more networks (when, e.g., in airplane mode, outside of wireless coverage, lacks a line of site to the sky, etc.). For example, if the TripCase application is running on a smart phone with GPS capabilities, user device 100 may be able to provide basic contextual services, such as real time directions from the airport to the hotel, even if there is no cellular or WiFi service. As another example, if there is WiFi or cellular service, the TripCase application may automatically check the user into the hotel upon determining that the user is within a given distance of the hotel.

The TripCase application may also use known information and retrieved information to provide advanced contextual services. In doing so, user device 100 may be configured to extract information from the raw data provided by a number of components and retrieve additional data from a remote source. For example, upon determining that user device 100 has arrived at the destination airport (based on, e.g., WiFi connections, cellular triangulation, time, GPS, and/or any other means), user device 100 can be configured to automatically recommend nearby restaurants (such as those currently open in a terminal), determine taxi cab fare estimates (for, e.g., transporting the user from the airport to the hotel), or perform any other advanced functionality. As another example, in response to determining based on known information that the user has arrived at a given airport gate and has a long layover, user device 100 can offer the user a coupon for a day pass at an airline's frequent flyer lounge or restaurant(s) in a given terminal.

In addition to offering TripAlerts and other useful travel services specific to the user's travel plans, activities and other known information, some embodiments of the Trip-Case application can be configured to enable user device 100 to, for example, allow the dynamic sharing of experiences, travel plans (and any changes that may occur), as well as other information. These features, among others, are shown in the drawings discussed below and can be integrated into or bundled together. In some embodiments, various aspects of the TripCase's functionality can be implemented by the use of separate, discrete features, referred to herein as TripAlerts (discussed above), "TripContent," "TripStream" and "TripLog", which may be individually downloaded, accessed, updated, and/or unlocked (for a fee or for free) within the TripCase application. In some embodiments, TripAlerts, TripContent, TripStream and/or TripLog can be configured to work independent of each other and/or the TripCase application, and be implemented as a stand alone application. Exemplary features of TripContent, TripStream and TripLog are discussed below.

Figure 3B:
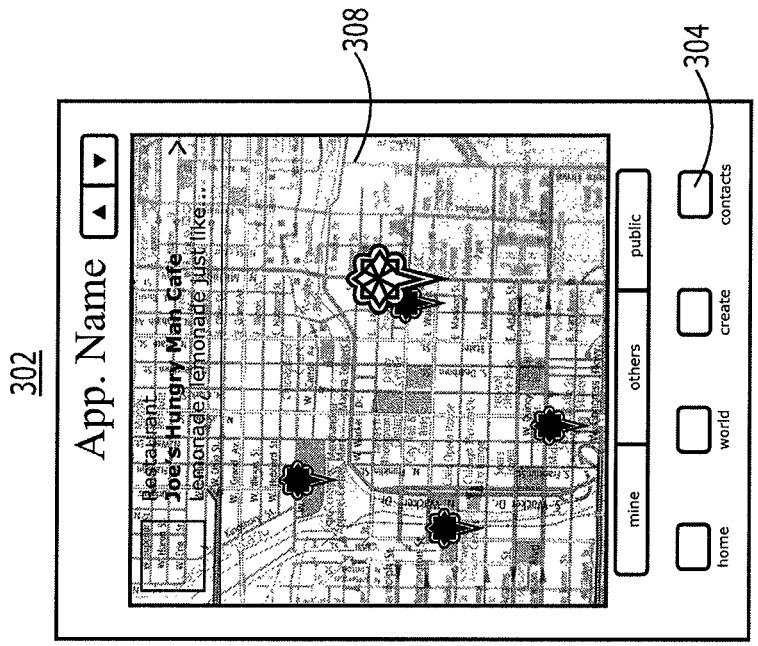
Figure 3A:
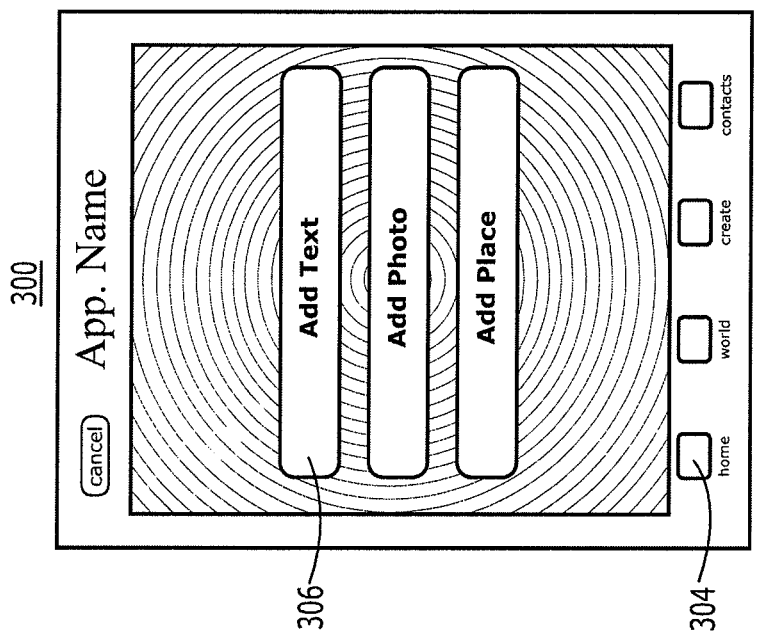

FIGS. 3A and 3B show displays 300 and 302, respectively. Displays 300 and 302 can be provided as part of the TripContent feature, which can be configured to capture and/or organize content generated during or otherwise associated with a trip and/or a plurality of related trips. Examples of trip content include booking information, traveler-entered notes, pictures, tweets, geolocation information (or places). The trip content can be placed in or otherwise associated with a "trip container" (e.g., file or other data organization structure), which is sometimes referred to herein as a "portable container" or a "portable digital container". The trip container can be configured to include, e.g., three different types of data, namely metadata (including, e.g., the who, what, when, where and why for a trip), booking data (including, e.g., travel itinerary, planned or available activities, and other booking components), and notes (time independent text, pictures, restaurant names, etc.).

The captured trip content can be stored locally (in, e.g., memory 110 of user device 100) or remotely (at, e.g., a network device) for retrieval and sharing with other people. In this regard, the initial step may be for the traveler to "name a trip". While this step may seem insignificant (to, e.g., the user), naming the trip (or any other) action can prompt the TripCase application (in, e.g., the background) to create a new portable digital container for collecting and storing trip content, including travel information (e.g., travel reservations, travel notes, travel photos, travel itinerary), as well as comments, ratings, etc. of places or other things of interest. Some or all elements of the new trip container can be geocoded via user device 100 by, e.g., associating metadata (defining, e.g., the current time and location, such as determined by the clock and GPS, of the user device at the time of creation) with the respective element. The TripContent feature may be converted to be used with other formats such as for a planning website (for element addition/collection), a booking website (for reservations on plans associated with the container), or for later display on a website (for reviewing past trips, sharing with others, etc.) with some or all content and mapping capabilities enabled.

For example, in response to the "create" option being selected in main options portion 304 of FIG. 3A, one or more additional options can be displayed in display portion 306. For example, "Add Text", "Add Photo", and/or "Add Place" options can be presented to the user. One or more of the options presented in display portion 306 can initiate the ability of user device 100 to import, for example, a passenger name record (PNR) or any other type of record. A PNR is a type of record currently maintained by some online travel reservation systems that includes at least one traveler's itinerary. (There may be a single PNR if a group of people are traveling together.) Upon importing the PNR information, it can be converted into a format unique to a trip container of TripContent, which may include metadata and elements (e.g., text, photo, location, event, etc.). In this regard, the TripContent feature can be configured to be either open to all systems or limited only to those who subscribe, pay and/or are otherwise authorized to utilize the feature.

One or more of the options included in display portion 306 can have the ability to create, edit, search and share TripContent elements, which can be tagged with, e.g., geocode and time. For example, in response to a user selecting an Add Place option presented in display portion 306, the user's current location can be tagged, added to map, and presented as shown by display 302. Pointers and/or any other means can be used to associate various pieces of data with a portable container.

Figure 5:
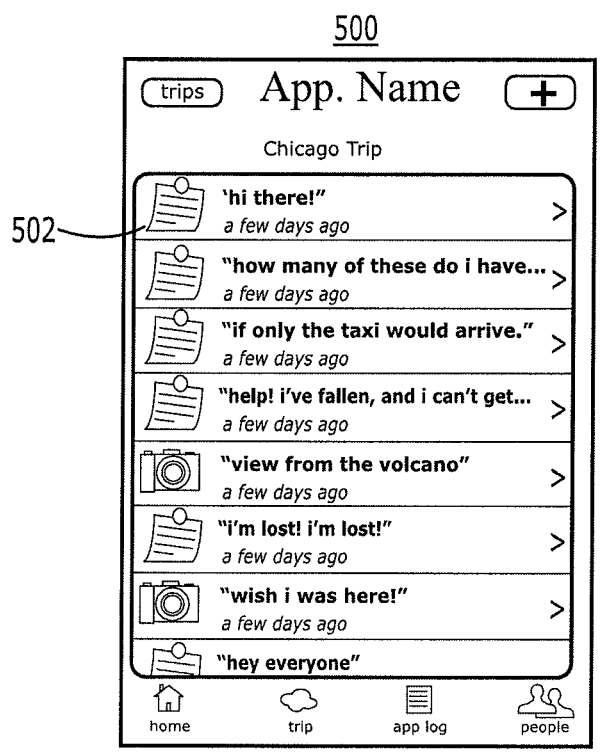

In response to an option being selected from display portion 306, user device 100 may also generate one or more messages, some examples of which are discussed in greater detail elsewhere herein (see, e.g., FIG. 5 and its related discussion). As such, the selecting of an option can act as a triggering event. For example, a user selecting the Add Text option can cause a message to be sent to a remote server, which includes the text being added. The remote server (examples of which are discussed in connection with, e.g., FIG. 6) can then update public and/or private webpage(s) with the text the user has added.

Figure 4:
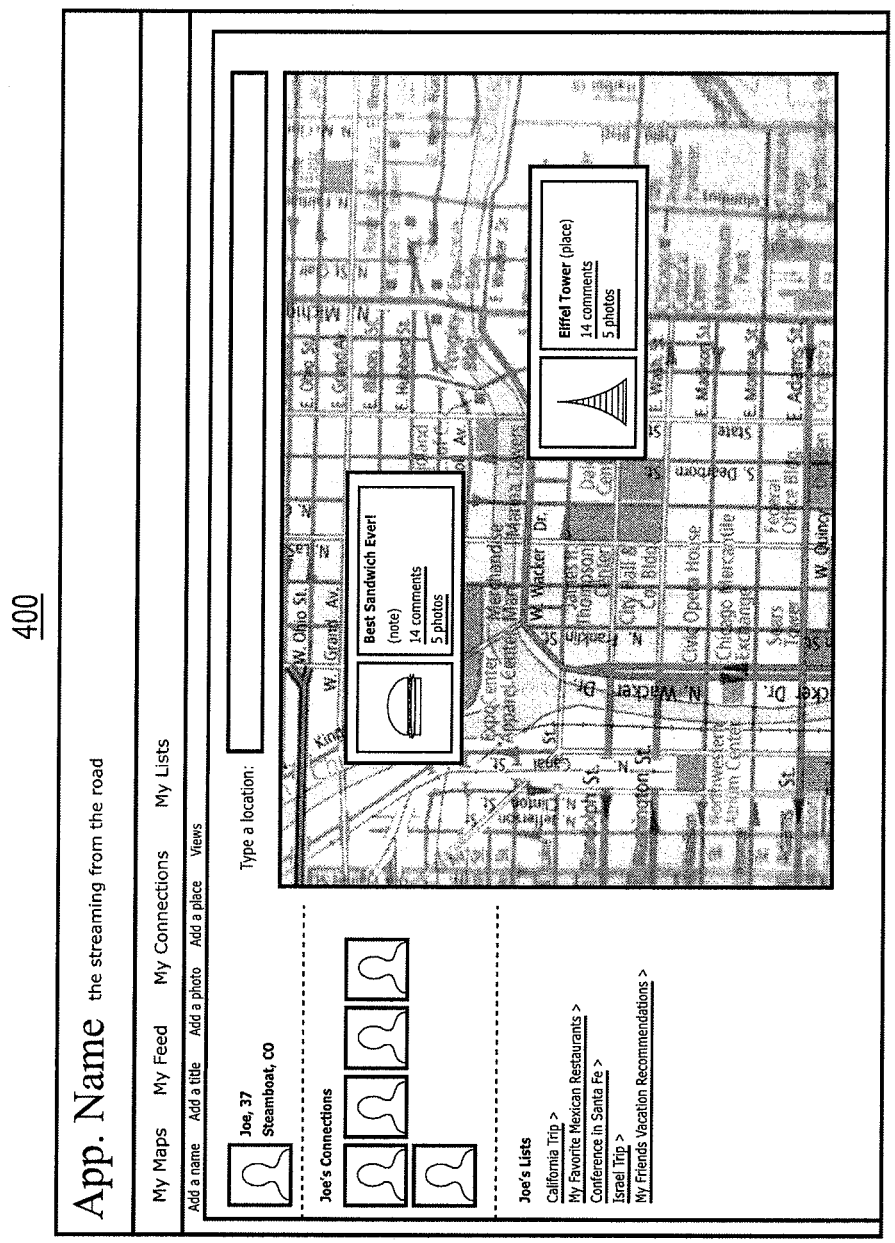

FIG. 4 shows display 400, which is an example of such a webpage that displays the text or other information the user entered into user device 100 in combination with a graphical representation the location associated with the geocode metadata automatically appended to the text by user device 100. This allows the user to share, among other things, photos, thoughts, video, and other information about places and people the user encounters while traveling or at any other time. In addition to travel-related uses, the current invention could be used for, e.g., police activities (e.g., documenting conditions and photos of car accidents or illegal acts), scientific studies (e.g., tracking and documenting species of insects, plants, and other animals), business and investment research (e.g., keeping notes about potential locations for opening a new business or real estate investments), among others.

FIG. 5 shows display 500, which is how the TripStream feature can be presented in accordance with some embodiments. The TripStream feature, in some embodiments, can help facilitate the delivery of alerts and other messages within the TripCase application. TripStream, as shown in FIG. 5, is a time ordered series of trip content that is associated with a trip container. New trip content can be collected within the TripContent container and display 500 can include updates and other event messages related to a traveler's plans. For example, display 500 includes listings 502, which include a number of TripStream messages and other trip content listings associated with a portable container.

Each listing included in listings 502 can be selectable, and one or more TripStream listings can be actionable. For example, a traveler can activate (by selecting a listing) a particular message or memory in the TripStream, and initiate application functionality or an embedded web browser interface to act on the information associated with the selected listing. For example, a user in transit may receive a TripAlert in the TripStream that his next flight has been canceled. Such a message may be provided before, e.g., a first leg of travel itinerary, before a connecting flight (e.g., after an initial flight) or at any other time. By selecting (e.g., clicking on or touching) the TripAlert notification, the TripStream will take the user to a page (such as a webpage, locally generated display, or any other type of display) that (a) prompts the user to call the airline, (b) provides a live webpage from the airline to rebook his flight, (c) provides a webpage from a corporate booking tool to rebook according to the corporate travel policies of the user's company, and/or (d) forwards that information to one or more other user devices (such as a family member's or business associate's). In some embodiments, the TripAlert notification need not be selected, but instead user device 100 can be, e.g., configured to automatically perform any of those steps and/or any other action in response to receiving or generating the TripAlert notification. The application can use logic to determine which path to display based on the issuer of the travel plans.

TripStream can also be used to organize information associated with a particular trip or trips, and/or provide information to other devices and people (even absent any alert or message). For example, TripStream can be used to create a sharable data feed of trip memories and notes as well as send specific people photos and other information. In some embodiments, each portable container can include a different set of recipients. For example, if traveling to Puerto Rico on business, the user could indicate a desire for the user device to create two portable containers for the trip. The first container could be for business trip content and the second container for pleasure trip content. The user could then create a first TripStream that uploads business-related trip content by the corporate network and a second TripStream for pleasure-related content that uploads trip content to personal websites. As such, each TripStream could effectively have its own portable container and separate target recipients.

In some embodiments, a public TripStream can be sent to all travelers having a user device that implements the TripStream application. For example, the user device can report publicly how long it took the user to get through security at a particular gate and all travelers may be able to set up a feed to receive such data (if deemed relevant based on, e.g., metadata). Public TripStreams can be enabled or disabled like any other feature discussed herein, or can be implemented in some embodiments as an integrated feature that must remain enabled and/or that cannot be disabled by the user device, thereby enabling the provider of the application to provide enhanced functionality to all its customers.

User device 100 can also be configured to generate one or more automatic TripStreams based on the components of user device 100. But rather than get pushed to all user devices like public TripStreams, automatic TripStreams may only get transmitted to backend systems of the application provider or developer. For example, user device 100 may be able to determine it is in traffic on a particular highway (based on, e.g., GPS and/or other components) and report the traffic situation to a backend device of Travelocity. In some embodiments, automatic TripStreams may be enabled or disabled by a user. In other embodiments, automatic TripStreams may be controlled remotely, similar to public TripStreams.

A TripLog feature is similar to a TripStream in that TripLog can also be configured to deliver content directly from the traveler and/or from an automated messaging system with the content being delivered to others designated by the traveler (e.g., user). But rather than sending to another device's TripStream application, TripLog can deliver content via one or more of multiple channels (for example, email and SMS). The TripLog feature may also track the content delivered in a single list on user device 100 similar to listings 502 of FIG. 5. In this regard, the TripLog feature can be configured to organize the information about the traveler's trip that is shared with others, similar to how a trip container can organize trip content that is associated with a trip. The TripLog feature can be a chronological series of updates that are provided to others by the application as well as generated manually by the user. The TripLog feature can accommodate update content that can range from, e.g., simple text to multimedia, depending, for example, on the capability of user device 100. The updates may be geocoded as described above and may be associated with the same TripContent container (e.g., one or more trip logs per container) or various trip containers. The user devices of other people (who may be or have been selected by the traveler, traveler's employer, traveler's parent, government agent, someone unrelated to the traveler, etc.) will receive notification of the update. In some embodiments, the others are able to respond, with those responses being attached to the update and redisplayed within the TripLog container. For example, a user on vacation takes a photo and appends the text "My hotel room view" and/or other metadata to the photo's digital image data. This content may be geocoded and placed into the TripLog container for later review by the user. Furthermore, notifications may be automatically sent to other individuals the user has previously identified (via email, SMS or other any other means). Those individuals can reply to the content, and the application can be configured to notify the user that responses have been received. A similar process may happen for TripStream messages generated by the application, such as flight arrival delays.

Figure 6:
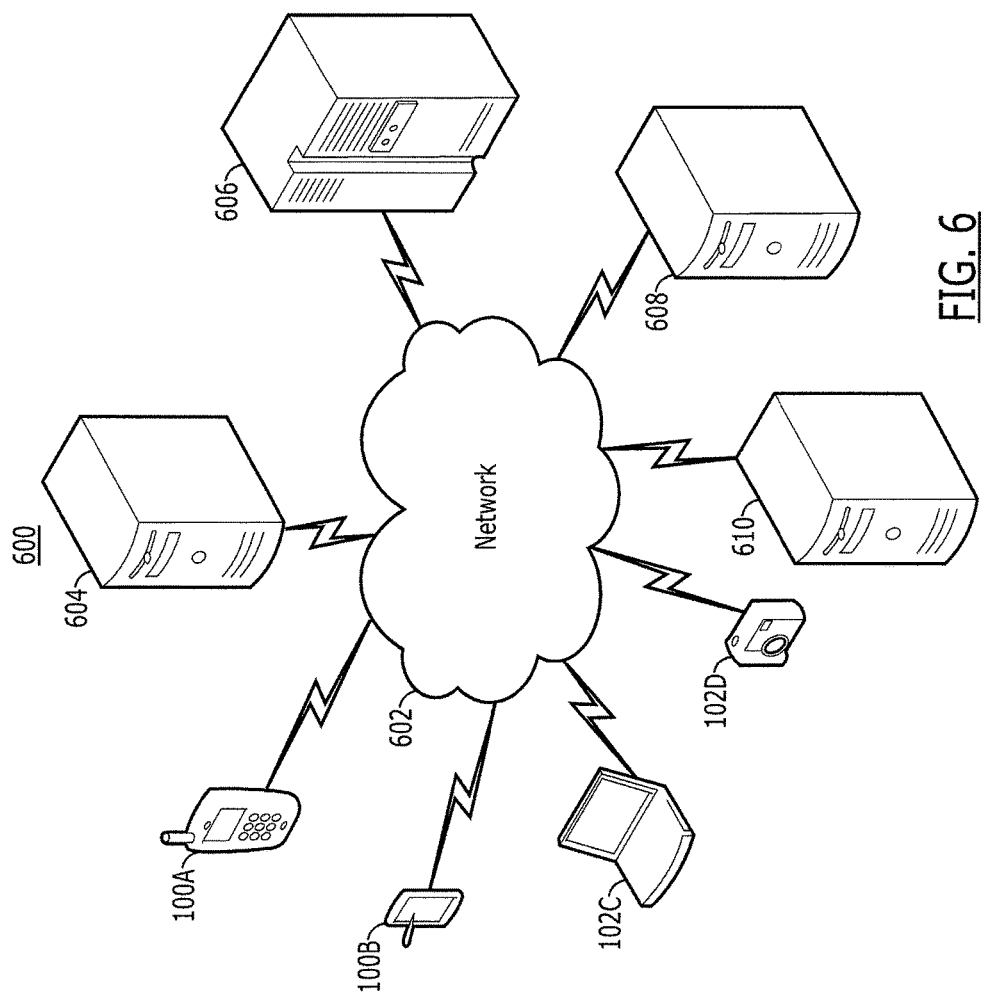
FIG. 6 shows an exemplary system in accordance with some embodiments discussed herein.

FIG. 6 shows exemplary system 600, which can be used to implement some embodiments discussed herein. System 600 includes user devices 100A, 100B, 100C and 100D. Each of user devices 100A, 100B, 100C and 100D can function the same as or similar to user device 100 discussed above. For example, user device 100A is shown as one type of handheld mobile device, namely a cellular phone, and user device 100B is shown as a second type of handheld mobile device, namely a touch-based device. User device 100C is shown as a laptop computer and user device 100D as a digital camera. Each of user devices 100A, 100B, 100C and 100D can be configured to include some or all of the components discussed in connection with user device 100 of FIG. 1. For example, user device 102D may be able to take a picture and receive user entered text via a touch-based interface, but lack a microphone to place a telephone call.

Each of user devices 100A, 100B, 100C and 100D are shown in FIG. 6 as being configured to connect wirelessly and/or otherwise to network 602. Network 602 can include any type or combination of networks, including WiFi, cellular, satellite, Bluetooth, Mesh, among others. Network 602 can help facilitate communications between or among user devices 100A, 100B, 100C and 100D. For example, user device 102A can belong to a traveler and user devices 100B and 100C can belong to the traveler's family, friends, co-workers, or anybody else anywhere in the world. User device 102A can be used to monitor the traveler's travel arrangements and upload information about the trip.

Server 604 can help facilitate the coordination and back-end aspects of the features employed by user devices 100A, 100B, 100C and 100D. For example, server 604 can be maintained by an online travel agency and serve as a gateway for requests received from the TripCase application running on one or more user devices 100A, 100B, 100C and 100D. In such embodiments, server 604 can authenticate, format, and/or perform any other action on data before it is sent to a user device or posted to a different server. Server 604 can also include access to one or more storage devices and be used to store configuration data, photos, text, messages, travel itineraries, subscription data (for, e.g., the user devices), host web pages (such as, e.g., display 500 discussed in connection with FIG. 5), etc.

Server 604 can communicate with one or more other devices, such as marketing partner 606, traffic system 608, flight information system 610, among others not shown to avoid over complicating FIG. 6. The provider of server 604 and the provider of marketing partner 606 can form a business partnership that is mutually beneficial. For example, marketing partner 606 can create online advertisements that server 604 pushes to the user devices. In exchange, server 604 may receive compensation from marketing partner 606. The advertisements can be targeted at particular user devices based on, for example, the travel information associated with the user device and/or the data the user device has uploaded (e.g., pictures, text or other information about the traveler's trip). For example, user device 102D may upload a picture of Times Square in New York City. In response to determining receipt of the picture being of Times Square (e.g., using image analysis technology) and/or the geocoded metadata, server 604 may send a digital coupon or other advertisement for a restaurant and/or retail establishment in or near Times Square that is associated with marketing partner 606. In addition to or instead of marketing and other advertising services, server 604 can help facilitate one or more other types of affiliated services (such as, e.g., check the traveler into a hotel, check local gasoline prices, obtain movie times, make dinner reservations, purchase tickets for an entertainment event, among others).

Server 604 can also facilitate the transfer of information from traffic system 608 and/or flight information system 610. For example, upon determining that user device 100B has arrived at its destination airport, server 604 can access traffic system 608 and determine whether there is traffic between the airport and the hotel. If there is more traffic than usual or no currently available taxis, server 604 can be configured to notify user device 100B and/or provide a coupon for a restaurant in the airport (that may or may not be associated with marketing partner 606) in the event the traveler decides to wait for the traffic to clear before leaving the airport. As another example, upon determining that a traveler's flight is delayed (based on data provided by, e.g., flight information system 610) and the amount of time it should take to get to the airport (based on data provided by, e.g., traffic system 608), server 604 can recommend when the traveler should depart for the airport, options of things to do until it is that time, or anything else. Server 604 could also push a notification (e.g., text message, TripCase alert, or any other type of notification) to the user device when it is time to leave for the airport.

In some embodiments, server 604 and/or any other device discussed herein can be omitted from system 600, can be configured to interact with only some of the other devices (e.g., server 604 can be configured to communicate only with user devices that subscribe to the services provided by server 604), or provide a subset of the features discussed herein (thereby omitting some features from system 600 or allowing other devices to facilitate the implementation of the unsupported features). In such embodiments, the user devices may communicate directly with the other devices (to, e.g., obtain traffic information, advertisements, flight information, bus schedules, and/or any other information).

Figure 7:
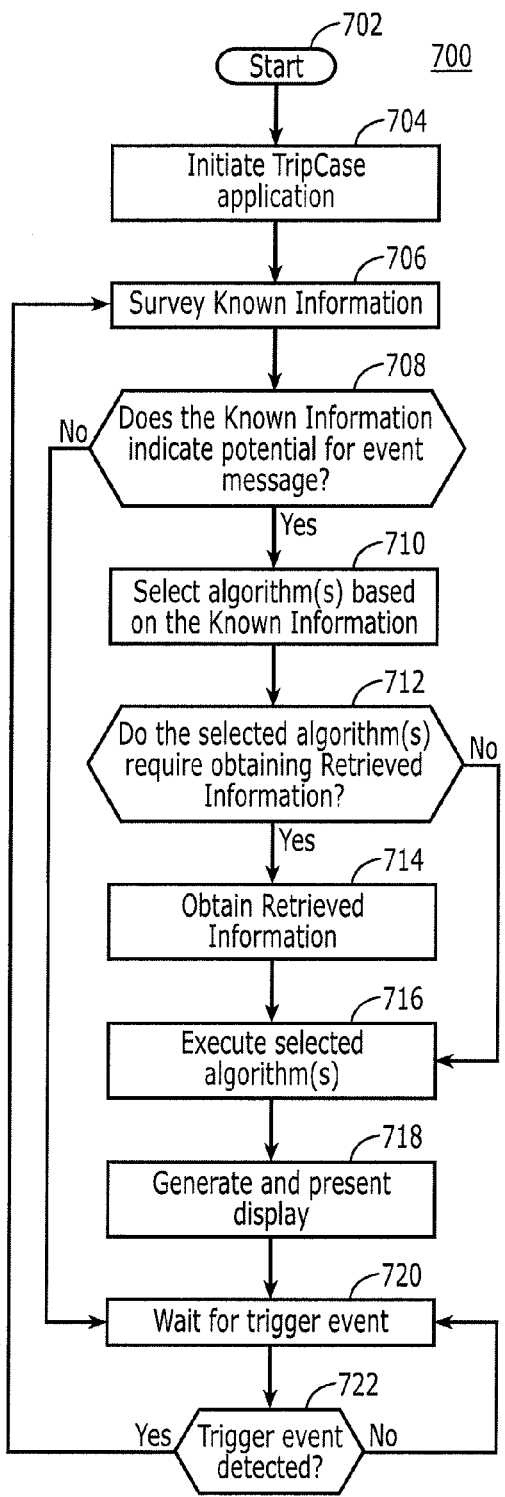
FIG. 7 shows a flow chart providing an example process 700 of how known information and/or retrieved information can be used to generate an alert, notification, other type of message, or combination thereof in accordance with some embodiments discussed herein.
Figure 8A:
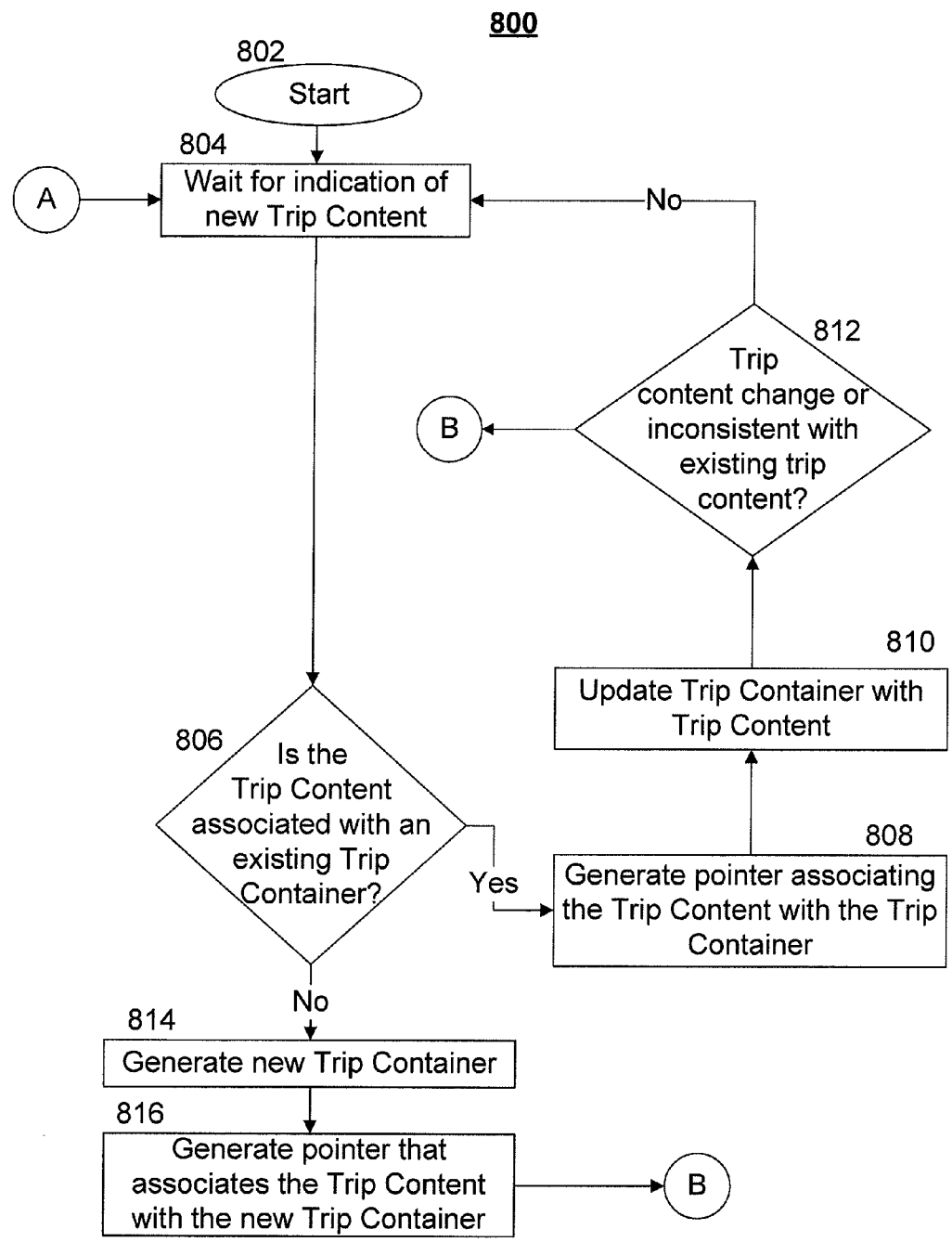
FIGS. 8A and 8B show an example process of how trip content can be managed in connection with one or more trip containers in accordance with embodiments discussed herein.

FIGS. 7 and 8 show flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, and/or executable computer-readable program code instructions stored therein. In this regard, program code instructions may be stored on a memory device of an example apparatus (e.g., user device 100) and executed by a processor of the apparatus. As will be appreciated, any such program code instructions may be loaded onto a computer or other programmable apparatus from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or other particular article of manufacture. The instructions stored in the computer-readable storage medium may produce an article of manufacture, where the article of manufacture becomes a means for implementing the functions specified in the flowcharts' operation(s).

Upon loading the instructions into a computer, processor, or other programmable apparatus, the computer, processor, or other programmable apparatus can be configured to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together or simultaneously. Execution of the program code instructions may produce a computer-implemented process such that the instructions executed by the computer, processor, or other programmable apparatus provide operations for implementing the functions specified in the flowcharts' operations.

Accordingly, the execution of instructions associated with the operations of the flowcharts by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions (e.g., field programmable gate arrays (FPGAs), application specific integrated circuits (ASICs), or combinations of special purpose hardware and program code instructions, some examples of which are discussed above.

FIG. 7 shows process 700, which is an example of how known information and/or retrieved information can be used to generate an alert, notification, other type of message, or combination thereof in accordance with some embodiments. Process 700 starts at 702.

At 704, the TripCase application is initiated by the apparatus. For example, an initiation event may comprise receiving an indication of a user's desire to select an icon or button provided by user device 100 and, in response to receiving the initiation event, user device 100 launches the TripCase application. (This type of user-based initiation is sometimes referred to herein as a "manual initiation.") As another example, a timer, other component of user device 100, or external device (e.g., cellular server) can generate the initiation event that triggers the launching of the TripCase application. (This type of system-based initiation is sometimes referred to herein as an "automatic initiation" and may be conducted periodically and/or dynamically to implement Barrier Based services.)

At 706, the TripCase application causes the apparatus to survey known information. As mentioned above, known information can include the current location, time, date, day of week, travel plans, contact information, and/or any other information the apparatus can access without having to establish communications with and/or retrieve from a remote source. In some embodiments, the TripCase application can be configured to query and process all known information. Other times, the TripCase application can query a subset of the available known information based upon, e.g., the type of initiation event.

At 708, the known information that was surveyed at 706 is processed by the apparatus, and a determination is made as to whether or not the known information indicates a potential for an event message, such as those discussed above in connection with TripAlerts. For example, the current time, date, location and travel itineraries may be surveyed, and the TripCase application can determine based on the surveyed information as to whether or not the user should consider leaving for the airport (e.g., whether or not it is within 6 hours or any other threshold time of a flight's departure).

In response to determining that the surveyed known information indicates a potential for an event message, at 710 the corresponding algorithm(s) are selected based on the surveyed known information. For example, if the TripCase application determines that it is within 6 hours of a departing flight, a "Get Traffic Information" algorithm and a "Get Airport Security Wait Time" algorithm can be retrieved from memory.

At 712, a determination is made as to whether the algorithm(s) selected at 710 require retrieved information (defined above). For example, the Get Traffic Information and the Get Airport Security Wait Time algorithms may require the apparatus to retrieve information from one or more remote servers.

In response to determining that the selected algorithm(s) require retrieved information, process 700 advances to 714. The apparatus can first establish a secure or unsecured communications link with one or more remote sources, and then download the retrieved information.

At 716, the selected algorithm(s) are executed. If retrieved information was required (or preferred) and obtained successfully, it is used to execute the algorithm(s). However, if retrieved information was not required by the selected algorithm(s), 714 is bypassed and 716 follows 712 in process 700, and the selected algorithm(s) are executed with only the known information.

At 718, the TripCase application generates and presents a display which may or may not include an event message as a result of the execution of the selected algorithm(s). For example, a TripAlert event message may be presented after determining that it is within 6 hours of the user's international flight's departure time, and that it will take approximately 3 hours to get to the airport with traffic and about another hour to get through security (due to, e.g., new screening measures being tested). As another example, an alert or other type of event message may not be presented if the travel time to the airport with traffic will be less than an hour. As yet another example, a reminder may be automatically scheduled to execute some or all the algorithm(s) again at a later time (such as in, e.g., an hour) based upon the outputs of the initial execution of the algorithms.

At 720, the TripCase application waits for a trigger event. In some embodiments, process 700 will flow from 708 to 720 in response to determining at 708 that the known information is not indicative of a potential event message. At 722, a determination is made as to whether or not a trigger event has been detected and/or received. If not, process 700 returns to 720. If so, process 700 returns to 706.

FIG. 8 shows process 800, which is an example of how trip content can be managed in connection with one or more trip containers. Process 800 starts at 802.

At 804, the apparatus or other type of machine(s) implementing process 800 wait(s) for an indication of new trip content. (Examples of trip content are discussed above.) Upon generating or otherwise receiving trip content, process 800 proceed to 806.

At 806, a determination is made as to whether the trip content is associated with an existing trip container. For example, process 800 may proceed to 808 if the current time, location, and/or other information (including receiving a response to a user prompt) can be used by the apparatus to determine which trip is currently underway and/or if the apparatus determines that a trip container has already been generated for the current trip. In some embodiments, the apparatus may present an option to the user, which allows the user to select an existing trip container or create a new trip container to place the new trip content.

In some embodiments, the apparatus generates at 808 a pointer or otherwise associates the trip content with the existing trip container for the trip that is currently underway, being planned or previously taken, in response to determining at 806 that there is an existing trip container for the new trip content.

At 810, the trip container is updated. The updating of the trip container can require, for example, dynamically rebuilding the trip container and/or the content within the trip container to incorporate the new trip content. In this regard, the trip content can be viewed as a single entity, in which any change to it may require the whole of the trip content to be analyzed and processed to determine whether new messages or offers for services should be generated and/or whether existing messages and offers for services should be deleted. In response to determining at 812 the new trip content conflicts with or otherwise changes the existing trip content of the trip container, process 800 can proceed to 818 of FIG. 8B, discussed below. Additionally, FIG. 9 provides examples of creating and updating trip content in accordance with embodiments of the present invention.

With regards to 806, should a determination be made that that there is not an existing trip container or that the user would like to associate the trip content with both an existing and new trip container, process 800 advances to 814 after 806.

At 814, a new trip container is created. In some embodiments, this may comprise creating a new electronic file or other type of organizational structure that can be used to link together one or more types of trip content. In some embodiments, trip content associated with one or more trip containers can be posted to a network, such as the Internet or corporation's internal network. For example, when generating a trip container, a user may select an option to post some or all of the trip content (e.g., only pictures and tweets, but not video) associated with the new trip container to a network location. As another example, the user may also create network access controls for trip content associated with the new trip container (e.g., username, password, authorized viewers, editors, authors, groups, etc.).

After generating a new trip container, the apparatus generates a pointer at 816, which associates the new trip content with the new trip container. One skilled in the art would appreciate that any means of association, in addition to or instead of pointers, may be used to associate trip content with one or more trip containers.

Figure 8B:
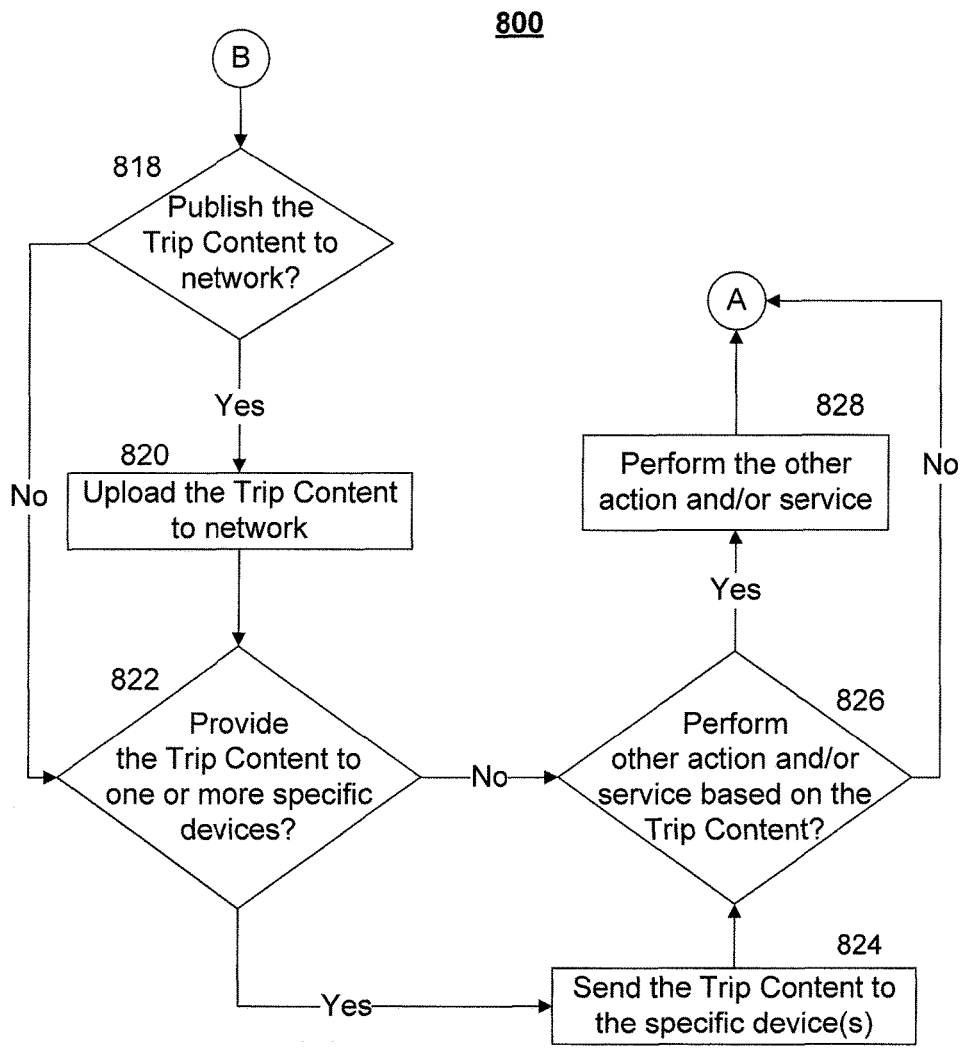
Figure 9:
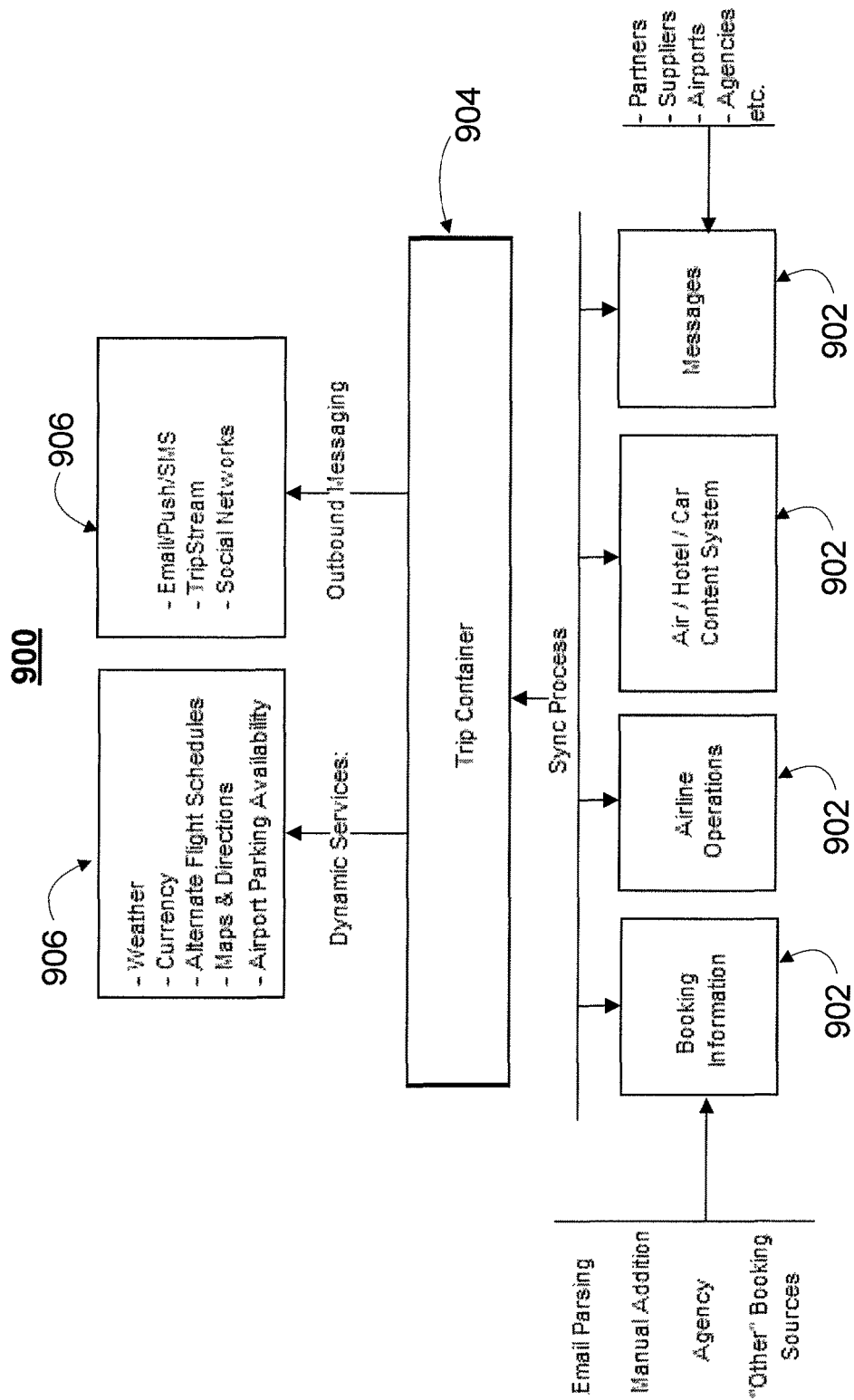
FIG. 9 shows a system diagram of components used to implement a synchronizing process in accordance with embodiments discussed herein.

Process 800 continues in FIG. 8B. In FIG. 8B, exemplary steps are shown which can be implemented when creating a new trip container or dynamically rebuilding an existing trip container in response to receiving new trip content. In this regard, the user device, remote devices, and other systems can be synchronized in real-time or near real-time.

At 818 of FIG. 8B, a decision is made as to whether or not to post the new trip content to one or more networks. The apparatus may base the decision of 818 on the type of content, access controls associated with the trip container, receiving a user input (in response to, e.g., a system-generated prompt), and/or any other information the apparatus can access. In response to determining the content should be uploaded to a network, process 800 proceeds to 820 and the trip content is uploaded to the network. In some embodiments, a network trip container can be maintained at a remote server in addition to or instead of a local trip container.

Process 800 advances to 822 after 820 or in response to determining at 818 that the content should not be uploaded to a network. At 822, a decision is made as to whether or not to send the new trip content to one or more specific device(s), such as, e.g., a family member's cell phone, home computer, secretary's work computer, among others. The apparatus may base the decision of 822 on the type of content, access controls associated with the trip container, receiving a user input (in response to, e.g., a prompt), and/or any other information the apparatus can access. The trip content is sent at 824 to the specific device(s) in response to determining that it should be at 822.

Process 800 advances to 826 after 822 or in response to determining at 822 that the content should not be sent to one or more specific devices. At 826, a decision is made as to whether or not to perform another action and/or service based on the trip content (some examples of which are discussed above, including downloading of coupons, providing marketing information, suggesting activities, among others). The apparatus may base the decision of 826 on, e.g., the type of content, access controls associated with the trip container, receiving a user input (in response to, e.g., a prompt), and/or any other information the apparatus can access.

In response to determining that no other actions should be or could be performed based on the trip content, process 800 returns to 804. In response to determining that no one or more other actions should be or could be performed based on the trip content, process 800 proceeds to 828 and the other action and/or service is performed. Process 800 then returns to 804 and waits for new trip content.

FIG. 9 shows system 900, which can implement process 800 to synchronize each of the devices and subsystems that may be involved, including provider systems 902, trip container 904, and user device agents 906. Provider systems 902 can include any type of networked system that may be related to and/or provide trip data. For example, one of provider systems 902 may be a booking system (such as Travelocity's booking system) and another may be a hotel content system.

As discussed above, a new trip container can be created (814 of FIG. 8A) in response to, for example, an itinerary being automatically sent from traveler's corporate booking website. The travel information may include:

Flight 1—departs 3/1 @ 1:00—Arrives 3:00;
Hotel ACME North for 2-nights;
No Car rental; and
Flight 2—departs 3/3 @ 2:30—Arrives at 5:30.

Subsequent to the creation of the trip container, trip container 904 can be configured to stay synchronized with the booking system and/or any other provider system 902 to help assure that the latest booking and other travel-related components are timely pulled into trip container 904. In this regard, the booking system, for example, can automatically generate messages and service information. For example, in response to determining there is no car in the traveler's itinerary, trip container 904 can be configured to automatically pull shuttle information provided by the traveler's destination hotel's provider system 902, and generate a message, displayed on the user device using one of user device agents 906, indicating that Hotel ACME North offers a free airport-to-hotel shuttle service.

In response to determining that the traveler has changed or otherwise updated the travel itinerary, trip container 904 can dynamically update itself. As such, should a travel component change, including a hotel supplier initiated change that indicates the hotel property has been sold to a competing hotel group, the information of trip container 904 may also be automatically changed. For example, the updated travel information may include:

Flight 1—departs 3/1 @ 1:00—Arrives 3:00;
Hotel ACME for 2-nights—Hotel name changes to HOTEL XYZ along with various policies and amenities;
No Car rental; and
Flight 2—departs 3/3 @ 2:30—Arrives at 5:30.

As shown above, the syncing processes used to update the information included in trip container 904 may include updating information generated by the hotel content system. Additionally, as a result of their being new hotel information in trip container 904, new messages and services may be generated and pushed to the user device. For example, the new hotel name can be communicated to traveler, along with amenities offered or no longer offered by the new hotel as compared to the old hotel. System 900 may also rebuild the entire trip container 904, to confirm there are no conflicts in other trip content that are indirectly related to the hotel change. For example, in rebuilding the lack of car rental in the itinerary, system 900 can be configured to again look at the (new) hotel policy for its airport shuttle offering. In response to determining the (new) hotel policy lacks free airport shuttle service, system 900 can be configured to retract the previous airport shuttle message and send a new message indicating that Hotel XYZ North offers an airport-to-hotel shuttle for a fee.

A traveler may initiate a second update to the travel itinerary. For example, the traveler may call or otherwise interact with the travel agency (by means of, e.g., a corporate booking tool) and change a flight to following day. Additionally, the traveler can change to a different hotel that is associated with the original ACME Hotel brand because of the traveler's or corporate loyalty program. Subsequent to the second change, trip container 904 may include the following trip content:

Flight 1—departs 3/2@ 1:00—Arrives 3:00;
Hotel Acme East for 1-night;
No Car rental; and
Flight 2—departs 3/3@ 2:30—Arrives at 5:30.

The syncing process used can include communications between trip container 904 and provider systems 902 can include, for example, communications with the travel agency's booking system (to, e.g., have the latest information pulled into the trip container as well as) and the hotel content system.

Messages and services can also be generated by system 900 in response to the second update. For example, system 900 can automatically detect during the rebuilding of trip container 904 that there is no car in the updated itinerary and again look at the (new) hotel policy of Hotel Acme East to determine whether it offers airport shuttle service and, if so, for how much. In response to system 900 determining that Hotel Acme East does not offer a shuttle service of any sort, system 900 removes the airport shuttle message and/or sends an updated message indicating the traveler no longer has a shuttle service available to the airport.

As a result of the message generated in response to the second update, the traveler may make a third update to the travel itinerary and add a new travel component, namely book a car and manually add it to trip container 900. In response to receiving the third update, trip container 904 may include the following information:

Flight 1—departs 3/2@ 1:00—Arrives 3:00;
Hotel Acme East for 1-night;
Car Rental (booked via another source but merged into the container); and
Flight 2—departs 3/3@ 2:30—Arrives at 5:30.

In synchronizing trip container 904, the booking system and a car content system may be communicated with. Additionally, the updated content of trip container 904 can trigger new messages and/or services in response to trip container 904 being dynamically rebuilt around the new trip content. For example, in response to system 900 detecting the addition of the (new) car rental, system 900 can automatically obtain the relevant pickup counter information and send a message informing the traveler that the rental counter for the car company is located off the airport premises but to look for a particular shuttle located on the lower level of the airport which will take the traveler to the car rental counter. As another example, system 900 may provide a service that offers the traveler an opportunity to view, on the user device, a map of the rental car pickup counter.

As a fourth example of an update that may be made, airline can initiate a change in the trip content because of, e.g., weather-related issues. For example, the airline may cancel flight 1. In response to receiving the fourth update, trip container 904 may include the following information:

Flight 1—departs 3/2@ 1:00—Arrives 3:00—CANCELLED;
Hotel Acme East for 1-night;
Car Rental (booked via another source but merged into the container); and
Flight 2—departs 3/3@ 2:30—Arrives at 5:30.

The update to trip container 904 can cause system 900 to dynamically rebuild trip container 904 and withdraw or delete previous messages and/or services and/or generate new messages and/or services. For example, the following actions may be generated and facilitated by system 900:

- a message informing traveler that Flight #1 on 3/2 has been canceled;
- a service offering to look for other flight schedules for the same day near the original scheduled flight;
- a service including to "click to call" button on the user device, which when selected calls the airline or agency and allows the traveler to reschedule the canceled flight;
- a service to check weather conditions and forecast at the arrival location;
- a cancellation message can also be escalated to an email, push message and/or SMS that is also sent to the traveler to communicate the cancellation; and
- a service that sends additional messages via email and/or social network to keep friends/family informed (if requested by the traveler).

A fifth update may be made to the trip content as a result of actions taken by the traveler and/or system 900 in response to, for example, the rebuilding of trip container 904 subsequent to the fourth update. For example, the travel agency rebooks the traveler on next flight (flight #3) leaving later that day. As a result, the new trip content may include:

Flight 3—departs 3/2@ 4:00—Arrives 6:00;
Hotel Acme East for 1-night;
Car Rental (booked via another source but merged into the container); and
Flight 2—departs 3/3@ 2:30—Arrives at 5:30.

The synchronization processes used to generate the (new) trip content may include communications between trip container 904 and, for example, booking system (replacing the new flight with the cancelled flight and merging the changes into the container with the manually added car rental) and hotel content systems (updating the traveler's planned arrival time). Additionally, system 900 may also modify and/or generate messages and/or offers for services, such as the following examples:

removal of flight cancellation message;
generation and delivery of message indicating the hotel requires check-in by 6 PM or it must be guaranteed with a credit card, in response to determining the new flight has a later arrival time in combination with knowledge of the hotel's check-in policy; and
offer a "click to call" service to the hotel or agency.

After making the fifth update to the trip content, the airline operations system may make a sixth update due to, for example, weather issues continuing and the later departing flight also being severely delayed. As a result of the sixth update, the content of trip container 904 may include:

Flight 3—departs 3/2@ 4:30—Scheduled Arrival 6:00—delayed arrival 10:00 PM;
Hotel Acme East for 1-night;
Car Rental (booked via another source but merged into the container); and
Flight 2—departs 3/3@ 2:30—Arrives at 5:30.

The synchronization processes used to generate the (new) trip content may include communications between trip container 904 and, for example, airline operation system (including continuous and/or periodic monitoring of flights and to determine weather flight #3's departure time has changed) and hotel content system. Additionally, system 900 may also modify and/or generate messages and/or offers for services in response to the sixth update to trip content 904, including the following examples:

Message is sent indicating the delay information
The message is also escalated to an email, push or SMS which is also sent to the traveler to communicate the delay.
Additional messaging will be sent via email or social network to keep friends/family informed of the delay (if requested by the traveler).
The system detects the delayed arrival time and the time of day that the traveler will be arriving. The system couples this information with information it knows about the hotel. A message is sent indicating that Hotel B offers room service which is available until midnight.

As such, trip container 904 can be dynamically rebuilt after being updated with new trip content. Dynamically rebuilding trip container 904 can include analyzing and processing the new set of trip content and how it impacts the existing trip content and/or entire set of trip content as a whole. The analysis can include searching and otherwise deriving information from local components and/or remote systems that may assist in generating a service and/or messages to be provided to the traveler as a result of the change(s) to the trip content. In addition to or instead of the types of updates discussed above, updates can also be made in response to, for example, trip content related to the user's current physical location, time, any other information that may be related to the user's trip, and/or any combination thereof.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of accessing and displaying information comprising:
    performing an offline process, the offline process comprising:
        surveying known information, the known information comprising information configured for access without having to establish communications with or retrieve from a remote source,
        wherein surveying the known information comprises:
            accessing, by a processor, known travel information;
            determining a physical location of a user computing device associated with the known travel information; and
            determining a current time;
        dynamically monitoring the physical location by increasing a frequency at which the physical location is determined as the current time approaches a barrier time, the barrier time indicative of a time at which an interference of the known travel information occurs if a barrier location is not reached; and
        determining, based on the current time and the physical location, that the known travel information indicates a potential for a message indicating interference of the known travel information;
    only after determining that the known travel information indicates a potential for a message indicating interference of the known travel information, performing an on-line process,
    wherein performing the on-line process comprises:
        determining that the message requires retrieved information;
        establishing a secure communications link with one or more remote sources;
        receiving time variable information that is dynamic; and
        determining, based on the known travel information, the current time and the physical location, that the time variable information interferes with the known travel information;
    providing the message to a user of the user computing device indicating interference of the known travel information;
    determining, based on the time variable information, the current time, the physical location and the known travel information, a service option that is available, wherein the service option helps reduce a negative consequence associated with the interference of the known travel information; and
    providing the service option to the user.

2. The method of claim 1, wherein:
providing the service option to the user comprises generating a user-selectable option offering to provide the service option.

3. The method of claim 2 further comprising:
receiving an indication of the user's desire to select the service option; and
in response to receiving the indication, assisting in enabling the utilization of the service option.

4. The method of claim 3, wherein the assisting further comprises at least one of facilitating the booking of new travel arrangements, facilitating the booking of a new airline ticket, facilitating the booking of new hotel reservations, facilitating a cancellation of existing travel arrangements, facilitating a modification of existing travel arrangements, facilitating a purchase of goods, obtaining a coupon for a good, and obtaining a coupon for a service.

5. The method of claim 3, wherein the assisting further comprises:
generating a message including information related to the interference of the known travel information; and
sending the message including information to another computing device.

6. The method of claim 1, wherein:
the determining the physical location is performed by the user computing device; and
the determining the service option is performed by a network computing device located remotely from the user computing device.

7. The method of claim 1, wherein the accessing the known travel information comprises the user computing device obtaining the known travel information from at least one of a network computing device located remotely from the user computing device, and a local storage component of the user computing device.

8. The method of claim 1, further comprising generating a new trip container comprising event information.

9. The method of claim 8 further comprising:
storing the new trip container in local storage of the user computing device; and
storing a copy of the new trip container in a network storage device located remotely from the user computing device.

10. The method of claim 1, wherein providing the service option comprises updating a user interface to indicate the service option, wherein the user interface includes details of the known travel information.

11. The method of claim 1, wherein the service option comprises an advertisement for goods or services.

12. The method of claim 11, wherein the service option comprises a coupon for the goods or the services.

13. An apparatus configured to access, download and display travel information from at least one remote source, comprising:
a processor configured to:
perform an offline process, the offline process configured to:
survey known information, the known information comprising information configured for access without having to establish communications with or retrieve from a remote source,
wherein surveying the known information causes the processor to:
access known travel information;
determine a physical location of the apparatus; and
determine a current time;
dynamically monitor the physical location by increasing a frequency at which the physical location is determined as the current time approaches a barrier time, the barrier time indicative of a time at which an interference of the known travel information occurs if a barrier location is not reached; and
determine, based on the current time and the physical location, that the known travel information indicates a potential for a message indicating interference of the known travel information;
only after determining that the known travel information indicates a potential for a message indicating interference of the known travel information, perform an on-line process,
wherein the on-line process is configured to:
determine that the message requires retrieved information;
establish a secure communications link with one or more remote sources;
receive time variable information that is dynamic; and
determine, based on the known travel information, the current time and the physical location, that the time variable information interferes with the known travel information;
provide the message to a user of the apparatus indicating interference of the known travel information;
determine, based on the time variable information, the current time, the physical location, and the known travel information, a service option that is available, wherein the service option helps reduce a negative consequence associated with the interference of the known travel information; and
provide the service option to the user.

14. The apparatus of claim 13, wherein the processor is further configured to generate, for inclusion in a display, a selectable option to share information indicating interference of the known travel information with another user computing device.

15. The apparatus of claim 13, wherein the processor is further configured to:
provide the service option to the user by generating a user-selectable option, for inclusion in a display, that offers to provide the service option.

16. The apparatus of claim 15, wherein the processor is further configured to:
determine that the user-selectable option has been selected; and
in response, assist in enabling the utilization of the service option.

17. The apparatus of claim 16, wherein the processor is further configured to at least one of facilitate the booking of new travel arrangements, facilitate the booking of a new airline ticket, facilitate the booking of new hotel reservations, facilitate a cancellation of existing travel arrangements, facilitate a modification of existing travel arrangements, facilitate a purchase of goods, obtain a coupon for a good, and obtain a coupon for a service.

18. The apparatus of claim 16, wherein the processor is further configured to:
facilitate payment for a good, a service or both; and
generate a display that includes a coupon with a scannable barcode associated with the payment for the good, the service, or both.

19. The apparatus of claim 13, wherein the processor is further configured to generate a new trip container comprising event information.

20. The apparatus of claim 13, wherein the processor is further configured to receive a new trip container from a remote computing device comprising event information.

21. The apparatus of claim 13, wherein the processor is further configured to:
provide the service option by updating a user interface to indicate the service option, wherein the user interface includes details of the known travel information.

22. The apparatus of claim 13, wherein the service option comprises an advertisement for goods or services.

23. The apparatus of claim 22, wherein the service option comprises a coupon for the goods or the services.

* * * * *